US012345386B1

(12) United States Patent
Dalal et al.

(10) Patent No.: US 12,345,386 B1
(45) Date of Patent: Jul. 1, 2025

(54) FORCE AIR MOISTURE MANAGEMENT FOR LAMPS

(71) Applicant: Toyota Motor Engineering & Manufacturing North America, Inc., Plano, TX (US)

(72) Inventors: Sunil Dalal, Canton, MI (US); John D. Harkleroad, Ypsilanti, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA (JP)

( * ) Notice: Subject to any disclaimer, the term of this patent is extended or adjusted under 35 U.S.C. 154(b) by 0 days.

(21) Appl. No.: 18/824,422

(22) Filed: Sep. 4, 2024

(51) Int. Cl.
*F21S 45/33* (2018.01)

(52) U.S. Cl.
CPC .................................... *F21S 45/33* (2018.01)

(58) Field of Classification Search
CPC ............................... F21S 45/33; B60Q 1/0005
USPC ................................................. 362/547, 345
See application file for complete search history.

(56) References Cited

U.S. PATENT DOCUMENTS 6,497,507 B1 12/2002 Weber
6,676,283 B2 6/2004 Ozawa et al.
7,275,848 B2 10/2007 Chinniah et al.
7,736,041 B2 6/2010 Tronquet
9,707,896 B2 7/2017 Boegel et al.
10,415,787 B2 9/2019 Lessard et al.
10,576,935 B2 3/2020 Sammarome et al.
10,634,308 B2 4/2020 Carnarius et al.
10,753,571 B2 8/2020 Schubert et al.
2016/0109087 A1* 4/2016 Ito .......................... F21S 45/33
362/547

FOREIGN PATENT DOCUMENTS

| | | | |
|---|---|---|---|
| CN | 208090587 | U | 11/2018 |
| EP | 3144583 | A1 | 3/2017 |
| FR | 2698055 | A1 | 5/1994 |
| IN | 20150612814 | | 5/2017 |
| JP | H08167306 | A | 6/1996 |
| KR | 101823384 | B1 | 8/2017 |

* cited by examiner

*Primary Examiner* — Thomas M Sember
(74) *Attorney, Agent, or Firm* — Snell & Wilmer LLP

(57) ABSTRACT

Methods, systems, and apparatus for lamp moisture management systems include a lamp housing including an inlet vent and an exit vent, a transparent cover plate covering a light exit hole in the lamp housing, and a conduit including a primary air inlet, an air outlet, a narrowed portion disposed between the primary air inlet and the air outlet, and a secondary air inlet disposed at the narrowed portion. The primary air inlet can be configured to receive a first flow of air through the conduit to induce a second flow of air through the lamp housing to evacuate a moist air from the lamp housing. Methods, systems, and apparatus can further include a fan configured to induce a flow of air through the lamp housing to evacuate a moist air therefrom.

19 Claims, 4 Drawing Sheets

FORCE AIR MOISTURE MANAGEMENT FOR LAMPS

BACKGROUND

Field

The present disclosure relates to lamps for vehicles and more particularly to systems and methods for managing moisture in vehicle lamps.

Description of the Related Art

Generally, automobiles are provided with lamp devices such as head lamps, tail lamps, fog lamps, and direction indicator lamps. In automobiles, head lamps are installed on the left and right sides of the front of the vehicle to illuminate the front of the vehicle at night so that the driver can drive the vehicle safely. Head lamps generally include an outer lens at the front of the lamp, a housing connected to the outer lens, and a bulb, which is a light emitting device detachably coupled to the housing. A reflector (reflective mirror) for reflecting light forward can be provided inside the housing. The light emitted from the bulb is illuminated or projected in a forward direction by the reflector to illuminate the area or space far in front of the vehicle. In recent years, light emitting diode (LED) lighting is being used instead of a bulb to provide more efficient lighting and a longer life. The main material used in lamps is plastics, which are hydroscopic in nature.

When heat sources such as the external environment or the bulb, the LED or the engine is turned on, the temperature of the lamp increases, and when the bulb, the LED or the engine is turned off, the temperature decreases. The lamp components, which are mostly made of plastics, release moisture at higher temperatures and absorb moisture again when the temperature drops. This phenomenon can occur repeatedly, which can cause repeated desorption and absorption of moisture by the lamp components.

In the process of absorption and desorption of moisture, the moisture content of air inside the lamp increases and condensation occurs on the inner surface of the outer lens. The internal condensation tends to lower the light distribution performance or affects the appearance, thereby lowering the reliability and the transparency of the head lamp.

Accordingly, it is desirable to provide systems, methods, and techniques for managing or removing moisture from inside the head lamp.

SUMMARY

One aspect of the subject matter described in this disclosure may be embodied in a lamp moisture management system or apparatus. The apparatus may include a lamp housing including an inlet vent and an outlet or exit vent. The apparatus includes a transparent cover plate covering a light exit hole in the lamp housing. The apparatus includes a conduit having a primary air inlet, an air outlet, a narrowed portion disposed between the primary air inlet and the air outlet, and a secondary air inlet disposed at the narrowed portion. The primary air inlet is configured to receive a first flow of air through the conduit to induce a second flow of air through the lamp housing to evacuate a moist air from the lamp housing.

In one aspect, the subject matter may be embodied in a vehicle. The vehicle may include a light source including a lamp housing and a transparent cover plate covering a light exit hole in the lamp housing, the lamp housing including an inlet vent and an outlet or exit vent. The vehicle may include a conduit including a primary air inlet, an air outlet, a narrowed portion disposed between the primary air inlet and the air outlet, and a secondary air inlet disposed at the narrowed portion. The primary air inlet is configured to receive a first flow of air through the conduit to induce a second flow of air through the lamp housing to evacuate or remove a moist air from the lamp housing.

These and other embodiments may optionally include one or more of the following features.

The primary air inlet can be configured to receive the first flow of air through the conduit in response to a driving motion of the vehicle.

The second flow of air can enter the lamp housing via the inlet vent and exits the lamp housing via the exit vent.

The second flow of air can flow from the exit vent into the conduit at the narrowed portion via the secondary air inlet.

The first flow of air and the second flow of air can merge at the narrowed portion of the conduit to form a merged flow of air that exits the air outlet of the conduit.

The vehicle can further include an intermediate conduit extending between and to the exit vent of the lamp housing and the narrowed portion of the conduit, whereby the conduit is in fluid communication with the lamp housing.

The exit vent can be located at a lower third of the lamp housing and the inlet vent is located at a top third of the lamp housing. The inlet vent can be located at a rear third of the lamp housing.

The inlet vent and/or the exit vent can be located in an engine compartment of the vehicle.

The exit vent can be located forward of a fan of the vehicle. The primary air inlet can be configured to receive the first flow of air through the conduit in response to operation of the fan.

In another aspect, the subject matter may be embodied in a method for evacuating or removing moist air from a lamp housing. The method can include receiving a first flow of air through a conduit, the conduit includes a primary air inlet, an air outlet, a narrowed portion disposed between the primary air inlet and the air outlet, and a secondary air inlet disposed at the narrowed portion whereby the conduit is in fluid communication with the lamp housing. The method can include, in response to receiving the first flow of air through the conduit, generating a low air pressure at an exit vent of the lamp housing. The method can also include, in response to generating the low air pressure at the exit vent of the lamp housing, inducing a second flow of air through the lamp housing to evacuate the moist air from the lamp housing.

In various aspects, the method further includes receiving the second flow of air into the conduit via the secondary air inlet, merging the first flow of air with the second flow of air to form a merged flow of air, and expelling or removing the merged flow of air from the conduit via the air outlet.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale and may be exaggerated to better illustrate the important features of the present invention.

DETAILED DESCRIPTION

Disclosed herein are systems, methods, devices, and/or vehicles for implementing a lamp moisture management system. Aspects and/or embodiments are directed to promoting air flow inside a vehicle lamp (e.g., a headlamp) to reduce fogging of the vehicle lamp lens. When there is a high level of moisture in the air of an interior cavity of a vehicle lamp assembly, the interior cavity can get damp or wet. Cold temperatures can cause moisture to condensate inside the lamp assembly.

The lamp moisture management system can use Bernoulli's principle to create active venting to pull the moist air out of the lamp housing and replace it with drier air from the engine compartment or the outside environment, in accordance with various aspects. The air can be forced into a conduit air inlet while the vehicle is in motion. A tapered section of conduit creates a low-pressure area which is used to pull (suction) moist air out of the headlamp assembly and replace the moist air with drier air such as from the engine compartment. This tends to mitigate fogging and/or allows for quicker clearing of the vehicle lamp lens if fogging is already present.

Figure 1A:
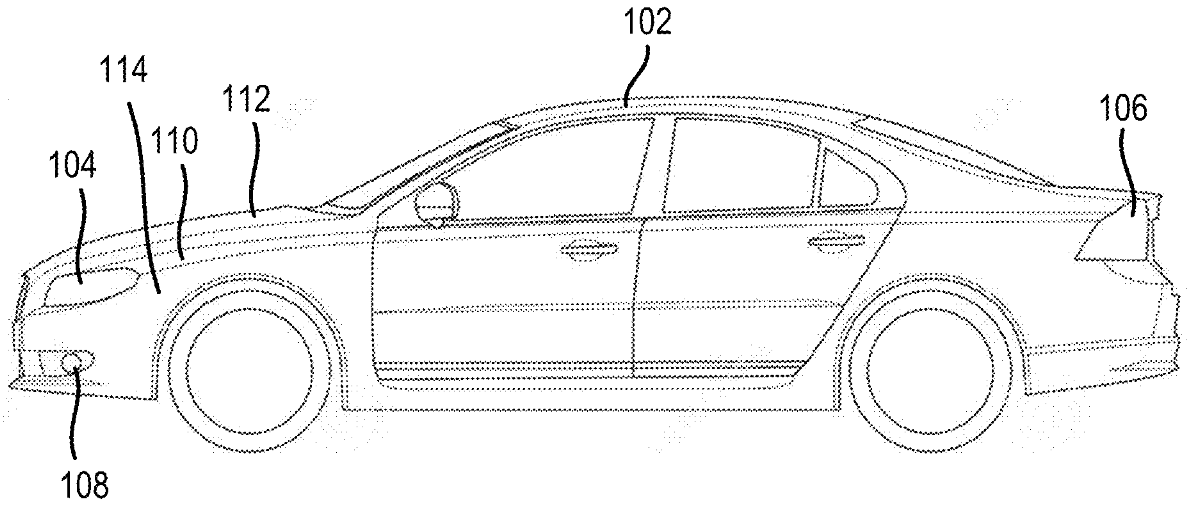
FIG. 1A and FIG. 1B are schematic side and front views of a vehicle, respectively, according to an aspect of the invention.
Figure 1B:
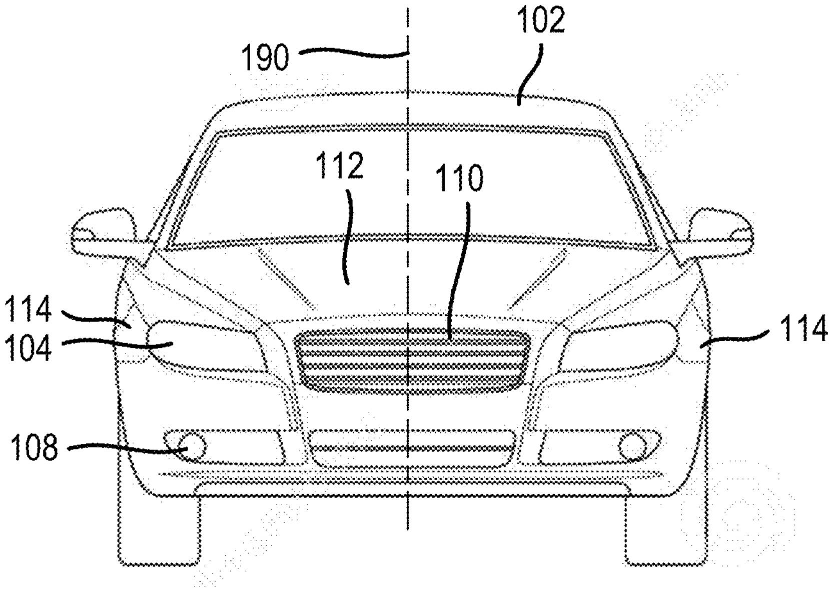

FIG. 1A and FIG. 1B are side and front views, respectively, of a vehicle 102 having a plurality of lamps, such as a head lamp 104, a tail lamp 106, and a fog lamp 108. Direction indicator lamps can be integrated into or be separate from the head lamp 104 and/or the tail lamp 106. The vehicle 102 may be a self-propelled wheeled conveyance, such as a car, a sport utility vehicle, a truck, a bus, a van or other motor, battery or fuel cell driven vehicle. For example, the vehicle 102 may be an electric vehicle, a hybrid vehicle, a hydrogen fuel cell vehicle, a plug-in hybrid vehicle or any other type of electric/hybrid vehicle. Other examples of vehicles include bicycles, trains, planes, or boats, and any other form of conveyance that is capable of transportation. The vehicle 102 may be semi-autonomous or autonomous.

In various aspects, the vehicle 102 includes an engine compartment 110. The engine compartment 110 can house an engine and other parts for the vehicle 102. The engine compartment 110 can be located under a hood 112 of the vehicle 102. The engine compartment 110 can be located laterally between front quarter panels 114 of the vehicle 102. Due to the heat generated by the engine during operation of the vehicle 102, the engine compartment 110 is generally warmer than the surrounding environment.

Although aspects of the vehicle lamp moisture management system are described herein with respect to a head lamp, it should be understood that the concepts described herein are not limited to use with head lamps as the disclosure and teachings may be applied to other types of vehicle lamps including tail lamps, fog lamps, direction indicator lamps, or any other vehicle lamps.

Figure 2A:
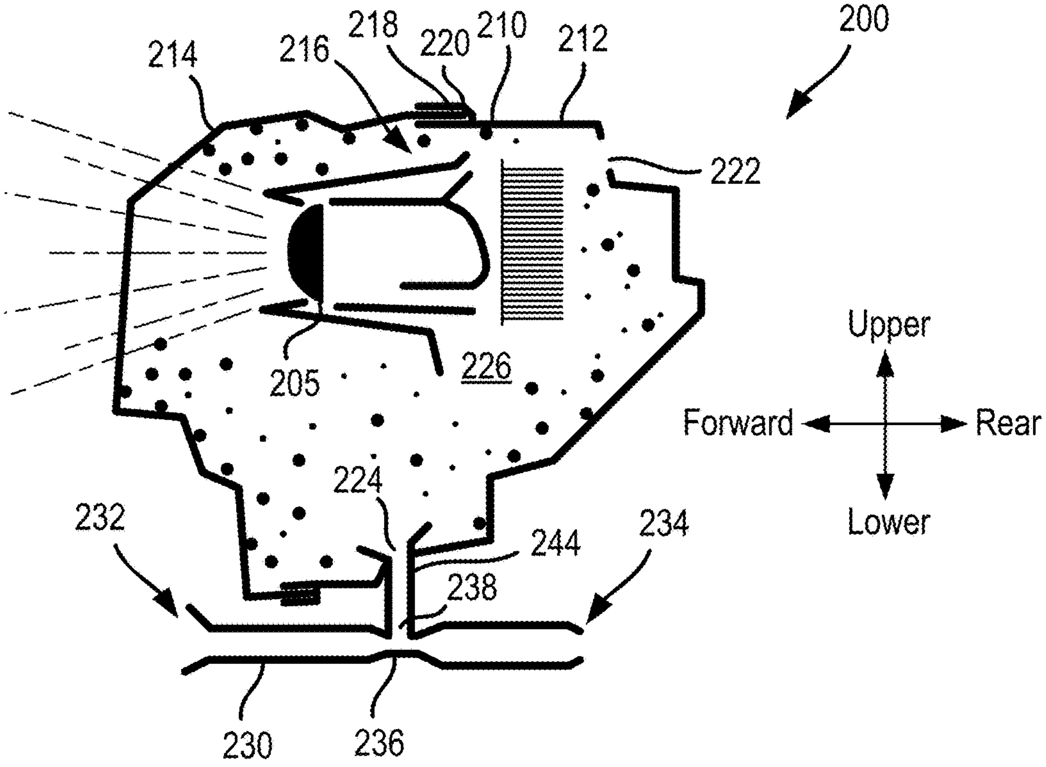
FIG. 2A and FIG. 2B are schematic views of a vehicle lamp including a lamp moisture management system when a vehicle is stopped and when a vehicle is in motion, respectively, according to an aspect of the invention.

FIG. 2A is a vehicle lamp 210 (also referred to herein as a lamp assembly) including a lamp moisture management system 200 for evacuating moist air from the vehicle lamp 210. The vehicle lamp 210 generally includes a lamp housing 212 and a transparent cover plate 214 (also referred to as a lens or a cover). The cover plate 214 can cover a light exit opening 216 of the lamp housing 212. An edge 218 of the cover plate 214 can be received by a sealing bed 220 encompassing the light exit opening 216 in the lamp housing 212. The edge 218 can be retained in the sealing bed 220 in a tight and secure manner. The cover plate 214 can seal the light exit opening 216. The lamp housing 212 and the cover plate 214 can define an interior cavity 226.

The vehicle lamp 210 includes at least one light source 205 (e.g., a light bulb or an LED) disposed in the interior of the vehicle lamp 210, which is configured to generate a light distribution, such as a head lamp light distribution, a tail lamp light distribution, a fog lamp light distribution, or a signal lamp light distribution. The at least one light source 205 can include, for example, 1-10 or even more, LED lights. The light distribution can be configured to comply with state and federal regulations. The light distribution can be emitted through the transparent cover plate 214.

In various aspects, the lamp housing 212 includes an inlet vent 222 and an outlet or exit vent 224. The lamp moisture management system 200 includes a conduit 230 in fluid communication with the inlet vent 222 and the exit vent 224. The conduit 230 includes a primary air inlet 232, an air outlet 234, a narrowed portion 236 disposed between the primary air inlet 232 and the air outlet 234, and a secondary air inlet 238 disposed at the narrowed portion 236.

FIG. 2A shows the interior cavity 226 having moist air (depicted by circles in FIG. 2A) disposed therein which can encourage or produce condensation and/or fog in the interior cavity 226 of the vehicle lamp 210. The primary air inlet 232 can be configured to receive a first flow of air through the conduit 230 to induce a second flow of air through the lamp housing 212 to evacuate or remove the moist air from the vehicle lamp 210 and/or the interior cavity 226.

Figure 2B:
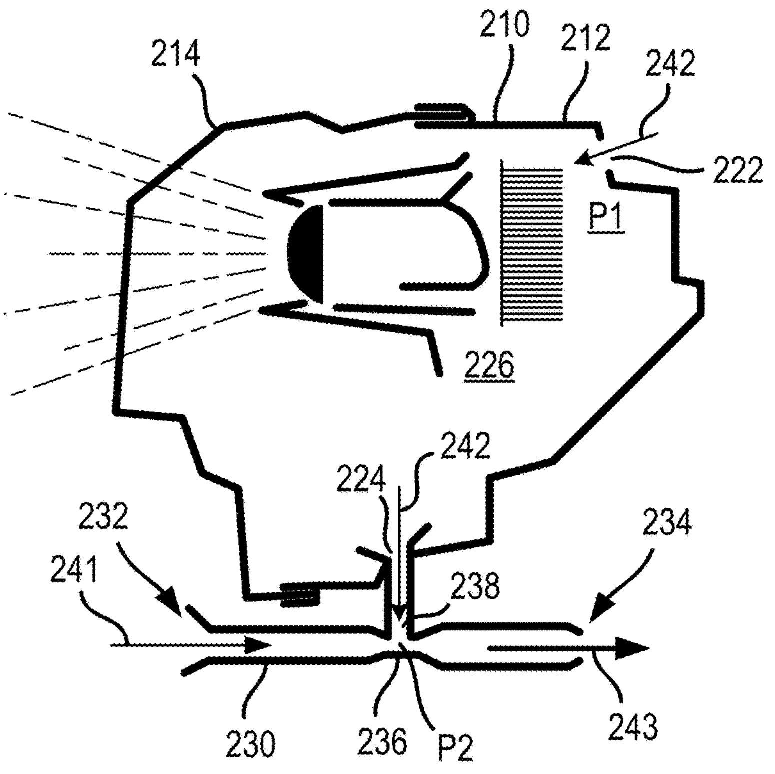

FIG. 2B shows the conduit 230 receiving a first flow of air 241 therethrough. In various aspects, the primary air inlet 232 can face forward when installed on the vehicle 102. In various aspects, the first flow of air 241 is received through the conduit 230 in response to a driving motion of the vehicle 102 to which the vehicle lamp 210 is installed (i.e., a forward driving motion). In this regard, the primary air inlet 232 can be located at a front end of the vehicle 102, for example, at or behind the front fascia/grille of the vehicle 102 in a location that receives a stream of air (i.e., is unobstructed from passing air). In various aspects, the conduit 230 is located at the bottom of the lamp housing 212. The primary air inlet 232 can be a ram-air inlet.

As the first flow of air 241 passes through the conduit 230, the first flow of air 241 can accelerate through the narrowed portion 236. The acceleration, or relatively faster speed, of airflow at the narrowed portion 236 may cause the pressure P2 at the narrowed portion 236 to have a lower pressure relative to the pressure at or near the primary air inlet 232. This pressure differential is caused by Bernoulli's principle, which says that an increase in fluid speed occurs simultaneously with decrease in pressure (e.g., the effect on the airflow through the narrowed portion 236), and a decrease in fluid speed occurs simultaneously with an increase in pressure. The acceleration, or relatively faster speed, of airflow at the narrowed portion 236 may cause the pressure P2 at or near the secondary air inlet 238 and the exit vent 224 to have a lower pressure relative to the pressure P1 at or near the inlet vent 222. This lower pressure P2 at the narrowed portion 236 induces a second flow of air 242 through the lamp housing 212 to evacuate moist air from the lamp housing 212 (i.e., the interior cavity 226). The second flow of air 242 can be pulled through the inlet vent 222, through the interior cavity 226 of the lamp housing 212, and out the exit vent 224. The second flow of air 242 can flow out the exit vent 224 and into the conduit 230 via the secondary air inlet 238 at the narrowed portion 236. The second flow of air 242 can merge with the first flow of air 241 at the narrowed portion 236 to form a merged flow of air 243 including the first flow of air 241 and the second flow of air 242. The merged flow of air 243 can exit the conduit 230 at the air outlet 234.

In various aspects, the air outlet 234 is located at a low-pressure area of the vehicle 102, such as the engine compartment, to aide in inducing air flow through the conduit 230. The air outlet 234 can face rearward. In various aspects, the inlet vent 222 is located at a low-pressure (or lower pressure) area of the vehicle 102, such as the engine compartment, to aide in inducing air flow through the interior cavity 226.

In various aspects, the conduit 230 and the lamp housing 212 are formed as two separate pieces and subsequently coupled together. For example, the conduit 230 can be removably coupled to the lamp housing 212. In various aspects, the conduit 230 and the lamp housing 212 are formed as a single, monolithic piece. For example, the conduit 230 and the lamp housing 212 can be formed together as a monolithic structure during an additive manufacturing process, an injection molding process, or any other suitable manufacturing process. In various aspects, the conduit 230 and/or the lamp housing 212 are made of a plastic material. In various aspects, the conduit 230 and/or the lamp housing 212 are made of a thermoplastic polymer, such as a polycarbonate material.

In various aspects, an intermediate conduit 244 can be disposed between the conduit 230 and the lamp housing 212 where the conduit 230 is in fluid communication with the lamp housing 212. The intermediate conduit 244 can extend between and to the exit vent 224 of the lamp housing 212 and the narrowed portion 236 of the conduit 230. In various aspects, the intermediate conduit 244 can be omitted and the narrowed portion 236 can be attached directly to, or formed integrally with, the lamp housing 212 at the exit vent 224.

In various aspects, the inlet vent 222 is located at an upper half of the lamp housing 212. In various aspects, the inlet vent 222 is located at an upper third of the lamp housing 212. In various aspects, the inlet vent 222 is located at an upper fourth of the lamp housing 212. In various aspects, the inlet vent 222 is located at a rear half of the lamp housing 212. In various aspects, the inlet vent 222 is located at a rear third of the lamp housing 212. In various aspects, the inlet vent 222 is located at a rear fourth of the lamp housing 212.

In various aspects, the exit vent 224 is located at a lower half of the lamp housing 212. In various aspects, the exit vent 224 is located at a lower third of the lamp housing 212. In various aspects, the exit vent 224 is located at a lower fourth of the lamp housing 212.

In various aspects, the exit vent 224 is located at an inner side of the lamp housing 212 so as to be nearer the centerline of the vehicle (see centerline 190 of FIG. 1B). In this manner, the exit vent 224 can be located nearer a heat source (e.g., a radiator) and/or warmer air, so as to release moisture from the air. In various aspects, the inlet vent 222 is located at an inner side of the lamp housing 212 so as to be nearer the centerline of the vehicle (see centerline 190 of FIG. 1B). In this manner, the inlet vent 222 can be located nearer a heat source (e.g., a radiator) and/or warmer air, so that the air entering the interior cavity 226 has minimal moisture content. In various aspects, the inlet vent 222 is located in an engine compartment of the vehicle (e.g., see engine compartment 110 of FIG. 1A and FIG. 1B). In various aspects, the exit vent 224 is located in an engine compartment of the vehicle (e.g., see engine compartment 110 of FIG. 1A and FIG. 1B).

In various aspects, a method for evacuating moist air from the lamp housing 212 can include receiving the first flow of air 241 through the conduit 230. The method can further include, in response to receiving the first flow of air 241 through the conduit 230, generating or producing a low air pressure P2 at the exit vent 224 of the lamp housing 212. The method can further include, in response to generating or producing the low air pressure P2 at the exit vent 224 of the lamp housing 212, inducing a second flow of air 242 through the lamp housing 212 to evacuate or remove the moist air from the lamp housing 212. The method can further include receiving the second flow of air 242 into the conduit 230 via the secondary air inlet 238. The method can further include merging the first flow of air 241 with the second flow of air 242 to form the merged flow of air 243. The method can further include expelling or removing the merged flow of air 243 from the conduit 230 via the air outlet 234.

Figure 3:
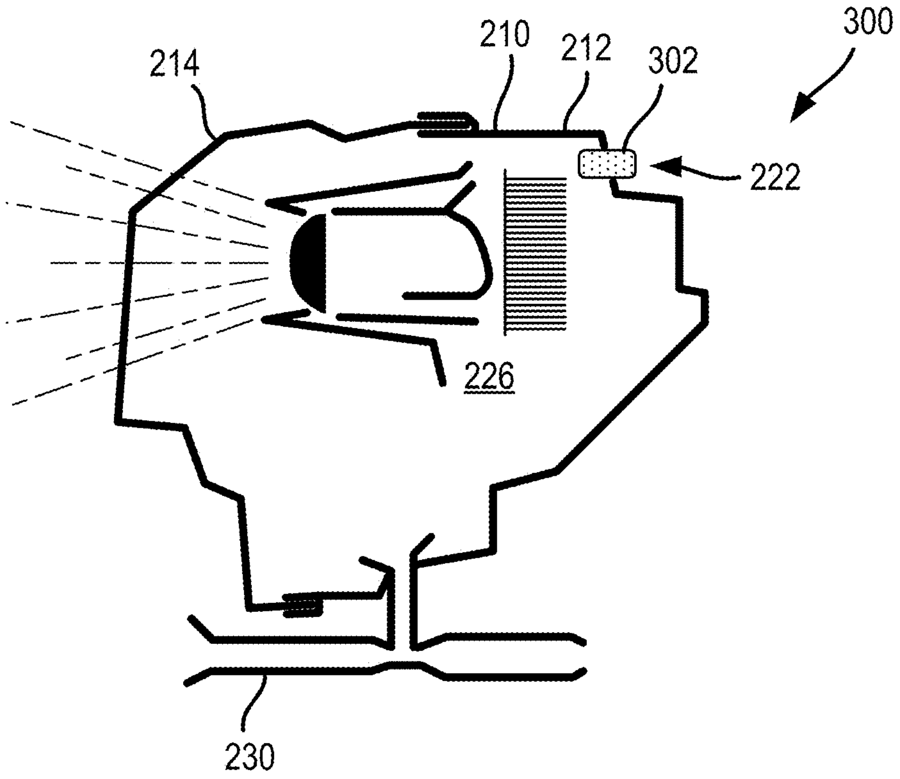
FIG. 3 is a schematic view of a vehicle lamp including a lamp moisture management system having a filter at an inlet vent of the lamp assembly, according to an aspect of the invention.

FIG. 3 shows a lamp moisture management system 300. With respect to FIG. 3, elements with like element numbering, as depicted in FIG. 2A, are intended to be the same and will not necessarily be repeated for the sake of clarity. The lamp moisture management system 300 is similar to the lamp moisture management system 200 of FIG. 2A and FIG. 2B, except the lamp moisture management system 300 further includes a filter 302 located at the inlet vent 222. The filter 302 can filter air that enters through the inlet vent 222. The filter 302 can prevent dust, debris, and/or moisture from entering the lamp housing 212. The filter 302 can be a pleated filter, a media filter, a foam filter, or any other suitable filter. The filter 302 can be used with any of the lamp moisture management systems of the present disclosure. In various aspects, a filter can similarly be used at the inlet of the conduit 230.

Figure 4:
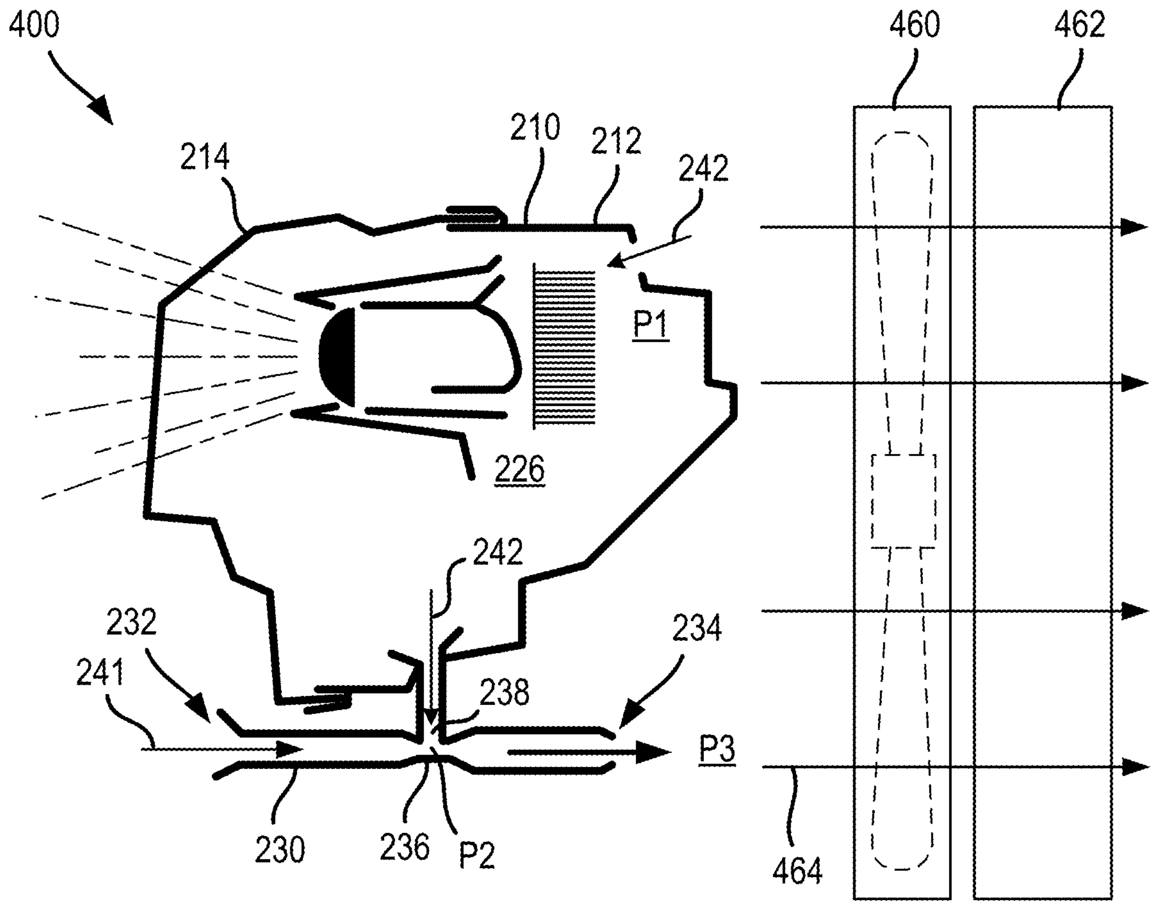
FIG. 4 is a schematic view of a vehicle lamp including a lamp moisture management system disposed in front of a radiator fan for inducing a flow of air through the lamp assembly, according to an aspect of the invention.

FIG. 4 shows a lamp moisture management system 400. With respect to FIG. 3, elements with like element numbering, as depicted in FIG. 2A, are intended to be the same and will not necessarily be repeated for the sake of clarity. The lamp moisture management system 400 is similar to the lamp moisture management system 200 of FIG. 2A and FIG. 2B, except the lamp moisture management system 300 has a fan 460 located adjacent the air outlet 234. For example, the fan 460 can be located aft of the air outlet 234. In various aspects, the fan 460 is a radiator fan. For example, the fan 460 can be configured to blow air through a radiator 462 for cooling.

When the fan 460 is turned on, a flow of air 464 can be pulled through the fan 460. This can cause the pressure P3 at the air outlet 234 near the inlet of the fan 460 to decrease and be less than the pressure P1 in the interior cavity 226 and/or the pressure at the primary air inlet 232. This pressure differential can induce the second flow of air 242 to move through the interior cavity 226 and out the conduit 230, thereby evacuating the interior cavity 226 of moist air. This pressure differential can induce the first flow of air 241 to move through the conduit 230, thereby inducing the second flow of air 242 and evacuating the interior cavity 226 of moist air. The lamp moisture management system 400 can operate even while the vehicle is stopped, since the fan 460 can operate while the vehicle 102 is stopped. The fan 460 may already be present in the vehicle 102 as part of the vehicle cooling system. In this regard, the lamp moisture management system 400 can utilize existing parts of the vehicle 102 and thereby reduce overall part count and/or increase efficiency of the vehicle 102.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

The invention claimed is:

1. An apparatus, comprising:

a lamp housing including an inlet vent and an exit vent, and with the lamp housing in an installed position on a vehicle, the inlet vent is configured to be located at a lower third of the lamp housing and the exit vent is configured to be located at a top, rear third of the lamp housing;

a transparent cover plate covering a light exit hole in the lamp housing; and a conduit including a primary air inlet, an air outlet, a narrowed portion disposed between the primary air inlet and the air outlet, and a secondary air inlet disposed at the narrowed portion, and the primary air inlet is configured to receive a first flow of air through the conduit to induce a second flow of air through the lamp housing to evacuate a moist air from the lamp housing.

2. The apparatus of claim 1, wherein the primary air inlet is configured to receive the first flow of air through the conduit in response to a driving motion of the vehicle.

3. The apparatus of claim 1, wherein the second flow of air enters the lamp housing via the inlet vent and exits the lamp housing via the exit vent.

4. The apparatus of claim 3, wherein the second flow of air flows from the exit vent into the conduit at the narrowed portion via the secondary air inlet.

5. The apparatus of claim 4, wherein the first flow of air and the second flow of air merge at the narrowed portion of the conduit to form a merged flow of air that exits the air outlet of the conduit.

6. The apparatus of claim 1, further comprising an intermediate conduit extending between and to the exit vent of the lamp housing and the narrowed portion of the conduit, whereby the conduit is in fluid communication with the lamp housing.

7. The apparatus of claim 1, further comprising a light source disposed in the lamp housing and, with the lamp housing in an installed position with respect to the vehicle, the light source is configured to generate a light distribution in a forward, horizontal direction that is perpendicular to a vertical direction.

8. The apparatus of claim 7, wherein, with the lamp housing in the installed position on the vehicle, the inlet vent and the exit vent are configured to be located in an engine compartment of the vehicle and the inlet vent and the exit vent are located at an inner side of the lamp housing, the inner side of the lamp housing is located nearer to a centerline of the vehicle than an outer side of the lamp housing.

9. A vehicle, comprising:

a light source including a lamp housing and a transparent cover plate covering a light exit hole in the lamp housing, the lamp housing including an inlet vent and an exit vent, and with the lamp housing in an installed position on a vehicle, the inlet vent is located at a lower third of the lamp housing and the exit vent is located at a top, rear third of the lamp housing;

a conduit including a primary air inlet, an air outlet, a narrowed portion disposed between the primary air inlet and the air outlet, and a secondary air inlet disposed at the narrowed portion and the primary air inlet is configured to receive a first flow of air through the conduit to induce a second flow of air through the lamp housing to evacuate a moist air from the lamp housing.

10. The vehicle of claim 9, wherein the primary air inlet is configured to receive the first flow of air through the conduit in response to a driving motion of the vehicle.

11. The vehicle of claim 10, wherein the second flow of air flows from the exit vent into the conduit at the narrowed portion via the secondary air inlet.

12. The vehicle of claim 9, wherein the second flow of air enters the lamp housing via the inlet vent and exits the lamp housing via the exit vent.

13. The vehicle of claim 12, wherein the first flow of air and the second flow of air merge at the narrowed portion of the conduit to form a merged flow of air that exits the air outlet of the conduit.

14. The vehicle of claim 9, further comprising an intermediate conduit extending between and to the exit vent of the lamp housing and the narrowed portion of the conduit, whereby the conduit is in fluid communication with the lamp housing.

15. The vehicle of claim 9, wherein at least one of the inlet vent and the exit vent is located in an engine compartment of the vehicle.

16. The vehicle of claim 9, wherein the exit vent is located forward of a fan of the vehicle, and the second flow of air is configured to be induced through the lamp housing in response to operation of the fan.

17. The vehicle of claim 9, wherein, with the lamp housing in the installed position on the vehicle, the inlet vent and the exit vent are located in an engine compartment of the vehicle and the inlet vent and the exit vent are located at an inner side of the lamp housing, the inner side of the lamp housing is located nearer to a longitudinal centerline of the vehicle than an outer side of the lamp housing.

18. A method for evacuating a moist air from a lamp assembly, comprising:

receiving a first flow of air through a conduit, the conduit includes a primary air inlet, an air outlet, a narrowed portion disposed between the primary air inlet and the air outlet, and a secondary air inlet disposed at the narrowed portion whereby the conduit is in fluid communication with the lamp assembly;

in response to receiving the first flow of air through the conduit, generating a low air pressure at an exit vent of the lamp assembly; and in response to generating the low air pressure at the exit vent of the lamp assembly, inducing a second flow of air through the lamp assembly to evacuate the moist air from the lamp assembly, the second flow of air enters the lamp housing via an inlet vent and exits the lamp housing via the exit vent, and, with the lamp housing in an installed position on a vehicle, the inlet vent is located at a lower third of the lamp housing and the exit vent is located at a top, rear third of the lamp housing.

19. The method of claim 18, further comprising:

receiving the second flow of air into the conduit via the secondary air inlet;

merging the first flow of air with the second flow of air to form a merged flow of air; and expelling the merged flow of air from the conduit via the air outlet.

* * * * *